(12) United States Patent
Mogilevskiy et al.

(10) Patent No.: US 11,693,748 B2
(45) Date of Patent: Jul. 4, 2023

(54) SYSTEMS AND METHODS FOR PROVISIONING AND DECOUPLED MAINTENANCE OF CLOUD-BASED DATABASE SYSTEMS

(71) Applicant: Auth0, Inc., Bellevue, WA (US)

(72) Inventors: Vitaliy Mogilevskiy, Bellevue, WA (US); Abhishek Chanda, Bellevue, WA (US); Norberto Leite, Bellevue, WA (US); Maryame Boulhajat, Bellevue, WA (US); Miguel Pilar, Bellevue, WA (US)

(*) Notice: Subject to any disclaimer, the term of this patent is extended or adjusted under 35 U.S.C. 154(b) by 0 days.

(21) Appl. No.: 17/331,369

(22) Filed: May 26, 2021

(65) Prior Publication Data
US 2021/0279150 A1 Sep. 9, 2021

(51) Int. Cl.
G06F 11/20 (2006.01)
G06F 16/21 (2019.01)
(Continued)

(52) U.S. Cl.
CPC ........ G06F 11/203 (2013.01); G06F 9/45512 (2013.01); G06F 11/1471 (2013.01);
(Continued)

(58) Field of Classification Search
CPC ............... G06F 11/203; G06F 9/45512; G06F 11/1471; G06F 11/366; G06F 16/211;
(Continued)

(56) References Cited

U.S. PATENT DOCUMENTS 10,628,394 B1 * 4/2020 Gurspan ............... G06F 16/214
11,113,186 B1 * 9/2021 Hussain ............. G06F 11/3664
(Continued)

OTHER PUBLICATIONS

S. Sakr and A. Liu, "SLA-Based and Consumer-centric Dynamic Provisioning for Cloud Databases," 2012 IEEE Fifth International Conference on Cloud Computing, 2012, pp. 360-367, doi: 10.1109/CLOUD.2012.11. https://ieeexplore.ieee.org/abstract/document/6253526 (Year: 2012).*

Primary Examiner — Bryce P Bonzo
Assistant Examiner — Michael Xu
(74) Attorney, Agent, or Firm — Holland & Hart LLP

(57) ABSTRACT

Methods and systems are described for provisioning cloud-based database systems and performing decoupled maintenance. For example, conventional systems may rely on database management systems to provision and modify databases hosted by a service provider. However, for entities operating complex database systems with the need for highly customized cloud infrastructure, database management systems fail to provide the granular customization and the control necessary to create and service these systems. In contrast, the described solutions provide an improvement over conventional database management system architecture by providing direct communication between an entity and its cloud-based database systems via command line prompts or API calls, decoupling database system maintenance from database system provisioning process to increase the speed and granular customization of the database system. Moreover, the disclosed solution leverages machine learning to predict optimal database system provisioning and maintenance processes and resources.

14 Claims, 5 Drawing Sheets

(51) Int. Cl.
   *G06F 11/14* (2006.01)
   *G06F 9/455* (2018.01)
   *G06F 11/36* (2006.01)

(52) U.S. Cl.
   CPC .......... *G06F 11/366* (2013.01); *G06F 16/211* (2019.01); *G06F 2201/80* (2013.01)

(58) Field of Classification Search
   CPC ............ G06F 2201/80; G06F 11/2094; G06F 11/2092; G06F 11/3664; G06F 11/3668; G06F 2201/81; G06N 3/084
   See application file for complete search history.

(56) References Cited

U.S. PATENT DOCUMENTS

| | | | |
|---|---|---|---|
| 2014/0181039 A1* | 6/2014 | Harrison | G06F 3/0665 |
| | | | 707/652 |
| 2017/0177324 A1* | 6/2017 | Frank | G06F 9/44536 |
| 2019/0102384 A1* | 4/2019 | Hung | G06F 9/45558 |
| 2019/0196800 A1* | 6/2019 | Shodhan | H04W 4/50 |
| 2020/0394120 A1* | 12/2020 | Fathi Salmi | G06F 8/36 |
| 2021/0081245 A1* | 3/2021 | Lowther | G06F 9/5072 |
| 2021/0103395 A1* | 4/2021 | Yankovskiy | G06F 3/0604 |
| 2021/0119940 A1* | 4/2021 | Kumar | G06F 11/2048 |
| 2022/0091947 A1* | 3/2022 | Kothari | H04L 43/50 |

* cited by examiner

SYSTEMS AND METHODS FOR PROVISIONING AND DECOUPLED MAINTENANCE OF CLOUD-BASED DATABASE SYSTEMS

BACKGROUND

Historically, hosted, cloud-based database management systems have been a desirable solution for entities that need flexible hosting solutions, mass configurability, mobile access to a database platform, and disaster recovery failsafes. However, features that make mass provisioning and configurability of a database system possible, come with unavoidable shortcomings, like tightly coupled Infrastructure as Code modules capable of making environment-wide modifications to live database systems, which can cause unintended downtime that can be hard to pinpoint and correct. Thus, as the need for custom cloud-based database deployment and maintenance becomes more prevalent, the disadvantages of modifying a database system through conventional Infrastructure as Code system architecture increasingly outweigh the advantages.

SUMMARY

Methods and systems are described herein for novel techniques for provisioning and maintenance of cloud-based database systems. Conventional Infrastructure as Code systems offer inflexible database maintenance and provisioning architecture, and often require database administrators to give up considerable control and customization of the maintenance process. The inability to customize a maintenance process specific to a live database system creates a considerable disadvantage for entities with complex database storage needs and can create friction with client-side database applications when the underlying database system is upgraded to a new version. Moreover, modifying a database system across multiple environments through conventional Infrastructure as Code system architecture can leave a database system in an inconsistent state when maintenance operation fails partway, which leads to a significant amount of time loss between the database system modification request and returning the database system to full production with the requested modifications, as each environment and its corresponding parameters and repositories must be analyzed for errors. Furthermore, in the event of an error during a transition from an initial instance to the requested modified instance, certain inflexibilities associated with the Infrastructure as Code application and the client-side application can leave the database system in an inoperable state, which can lead to downtime. One having ordinary skill in the art will immediately recognize the need for solutions to the aforementioned problems, as such risk with persistent resources such as databases can lead to considerable data loss.

In view of these problems, the methods and systems described herein use one or more novel techniques for managing database systems that do not suffer the drawbacks of conventional Infrastructure as Code architecture. For example, the described solutions provide an improvement over conventional Infrastructure as Code architecture at least by enabling communication for an entity with a service provider via API calls, by provisioning database systems based on metadata templates, and by decoupling database system maintenance from the database system provisioning process to increase the speed and granular customization of the database system topology. Specifically, the methods and systems described herein provide solutions for provisioning, maintaining, and managing cloud-based database system hosted by a third-party service provider through a single command line prompt or API calls.

For example, a database system may be provisioned with a template by initiating API calls to a service provider that will host the database system. The process of provisioning the database system may further include checking a metadata repository that contains a list of all database systems, including those that existed before the current provisioning automation was put into service. This metadata repository makes it possible to determine if the database system already exists, in which case, it stops provisioning pipeline from executing even if the current provisioning template parameters differ from parameters that originally created this database system. This step is in contrast with conventional Infrastructure as Code applications that attempt to mass modify existing database systems if the original provisioning template parameters differ. Furthermore, metadata repository is automatically kept in sync by the provisioning pipelines after its initial reverse sync with the service provider. Additionally, metadata associated with database systems may be stored in the metadata repository and may be grouped by a certain environment name attribute that makes it possible to create a similar copy of such environment as a cohesive set, based on saved configuration data.

Moreover, a database system may be maintained by a process that is decoupled from the provisioning process. Decoupling the maintenance process from the provisioning process enables individualized database modification and permits greater control over database systems. For entities that have no common baseline configuration for databases and need highly customizable environments, this additionally allows these entities to incrementally bring all existing databases to a common baseline with customized maintenance commands that sequence Modify API calls to a service provider based on the state of the database at that point in time. Furthermore, to avoid time loss or data loss associated with conducting maintenance through conventional processes, the maintenance process may create standby databases so that an experiment can be conducted on a database prior to permanently implementing the changes.

In some respects, methods and systems described herein use one or more database system management techniques for provisioning and modification purposes. For example, a server system may at a first point in time, request to provision a database system. In response to the request, the server system may determine whether metadata associated with the database system exists by querying a metadata repository. The server system may generate database system resources based on a determination as to whether metadata associated with the database system exists. The server system may generate the database system, in response to generating the database system resources. In response to generating the database system, the server system may generate user access credentials. The server system may store a second metadata associated with the database system in the metadata repository. At a second point in time, subsequent to the first point in time, the server system may receive a request to modify the database system, wherein the request to modify includes one or more modification parameters and the user access credentials. The server system may determine a set of pre-determined modification protocols in response to the request to modify the database system. The server system may determine whether to create a standby database system in response to the request to modify the database system and the set of pre-determined modification protocols. The server system may conduct an experiment on the database system based on at least the pre-determined modification protocols and by executing the modification parameters. The server system may modify the database system based on the experiment.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, structures and devices are shown in block diagram form to avoid unnecessarily obscuring the embodiments of the invention.

Figure 1:
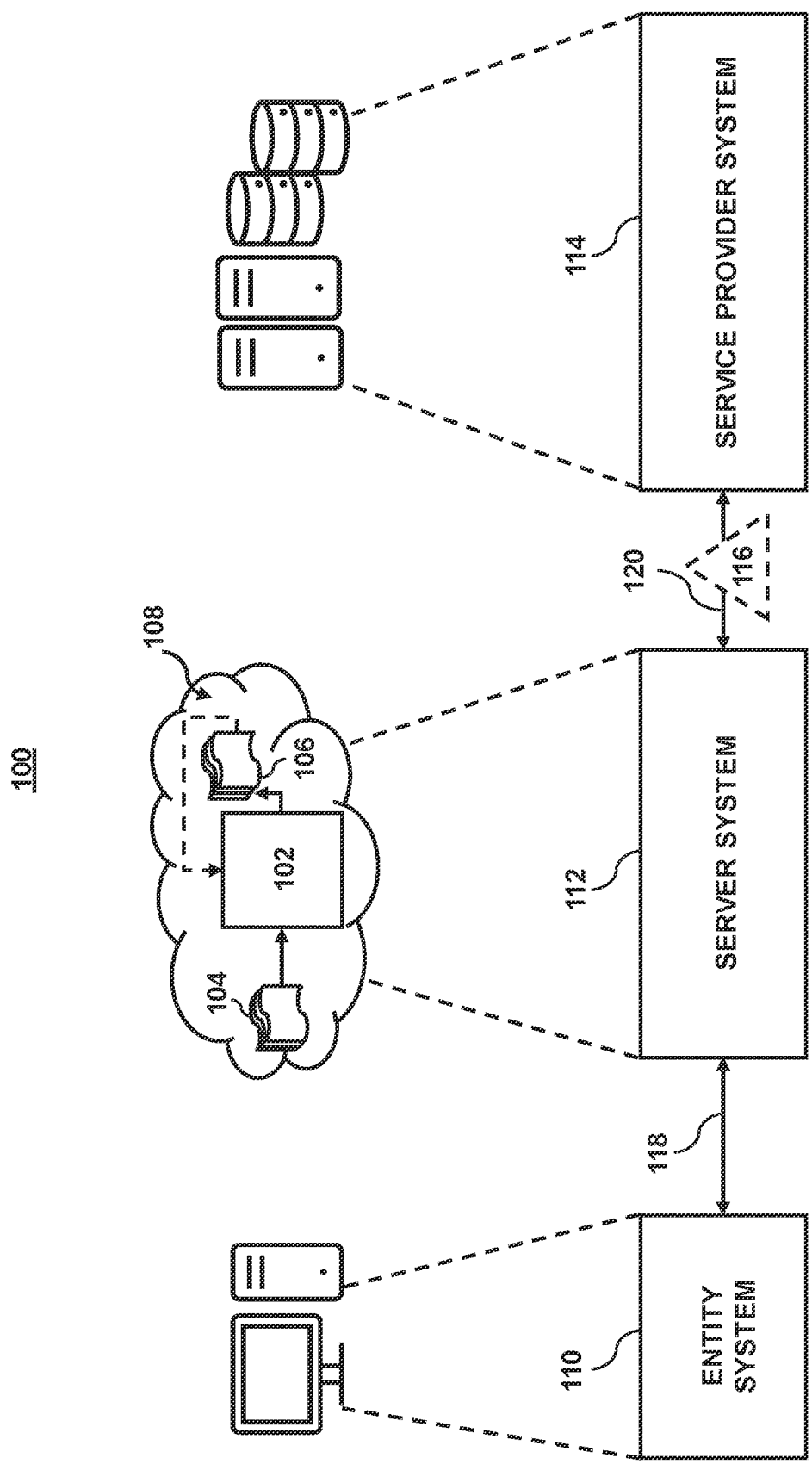
FIG. 1 shows an illustrative system architecture for provisioning and modifying a database system, in accordance with one or more embodiments.
Figure 2:
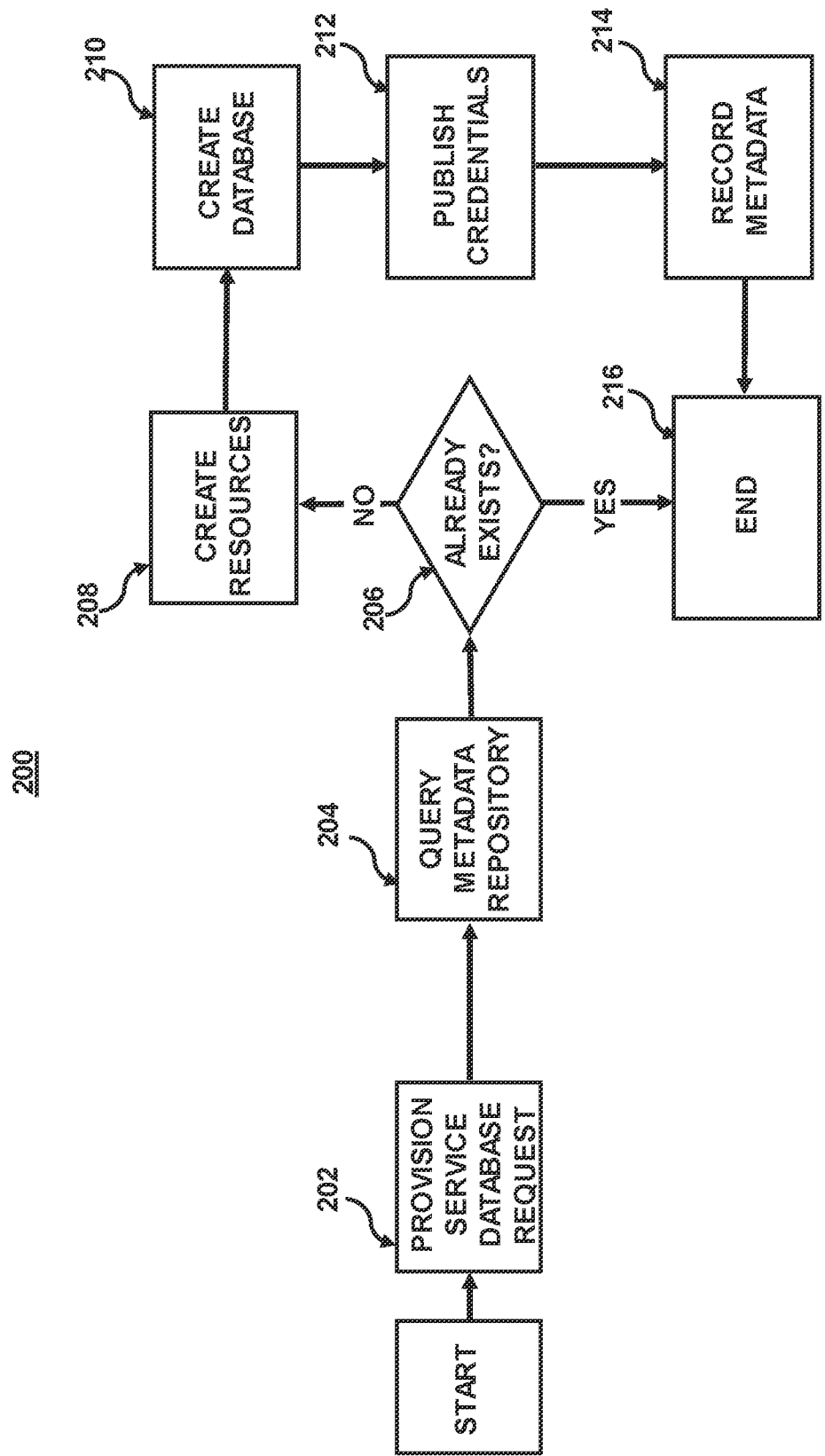
FIG. 2 shows an illustrative flowchart for provisioning a database system, in accordance with one or more embodiments.
Figure 3:
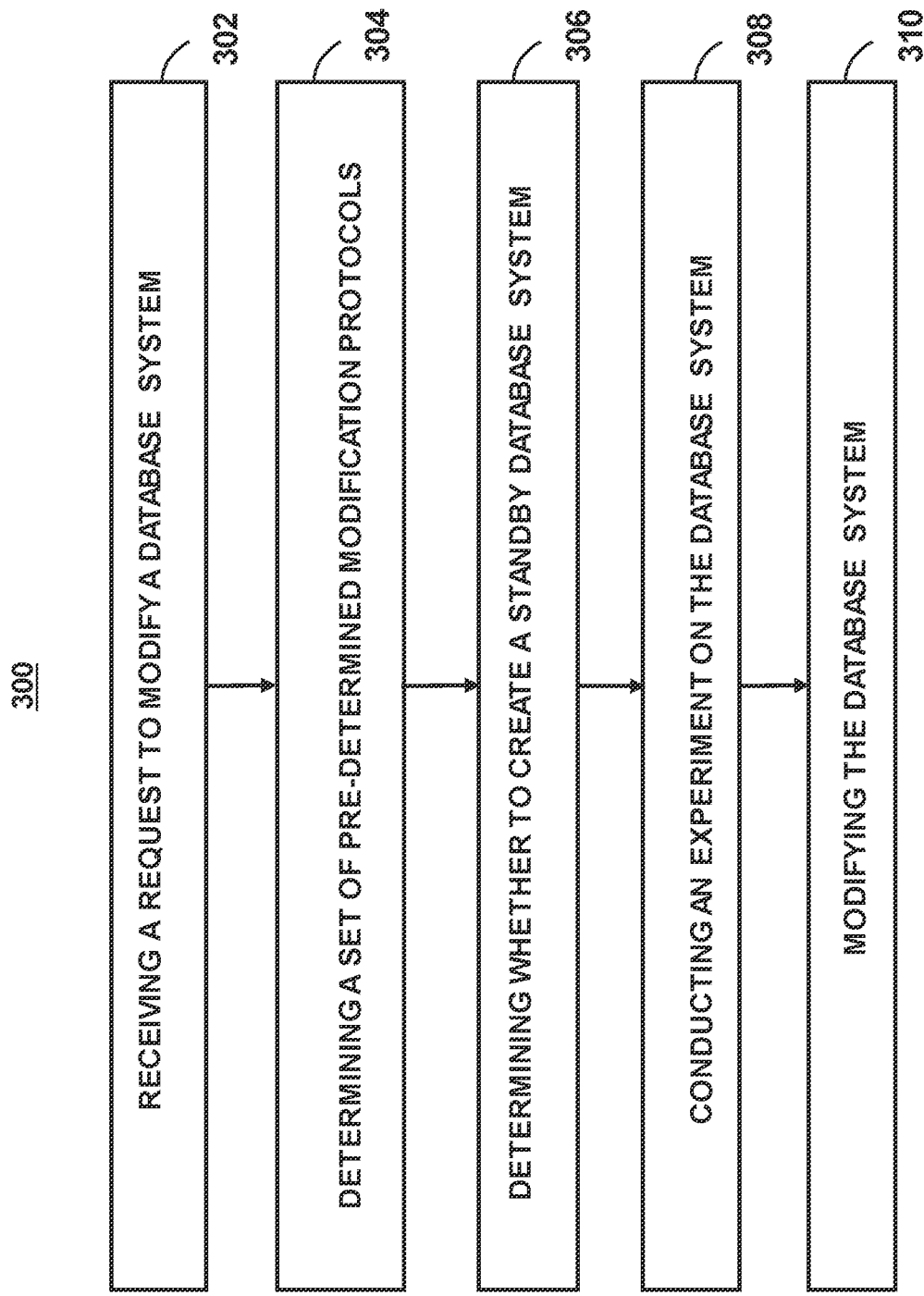
FIG. 3 shows an illustrative flowchart for modifying a database system, in accordance with one or more embodiments.
Figure 4:
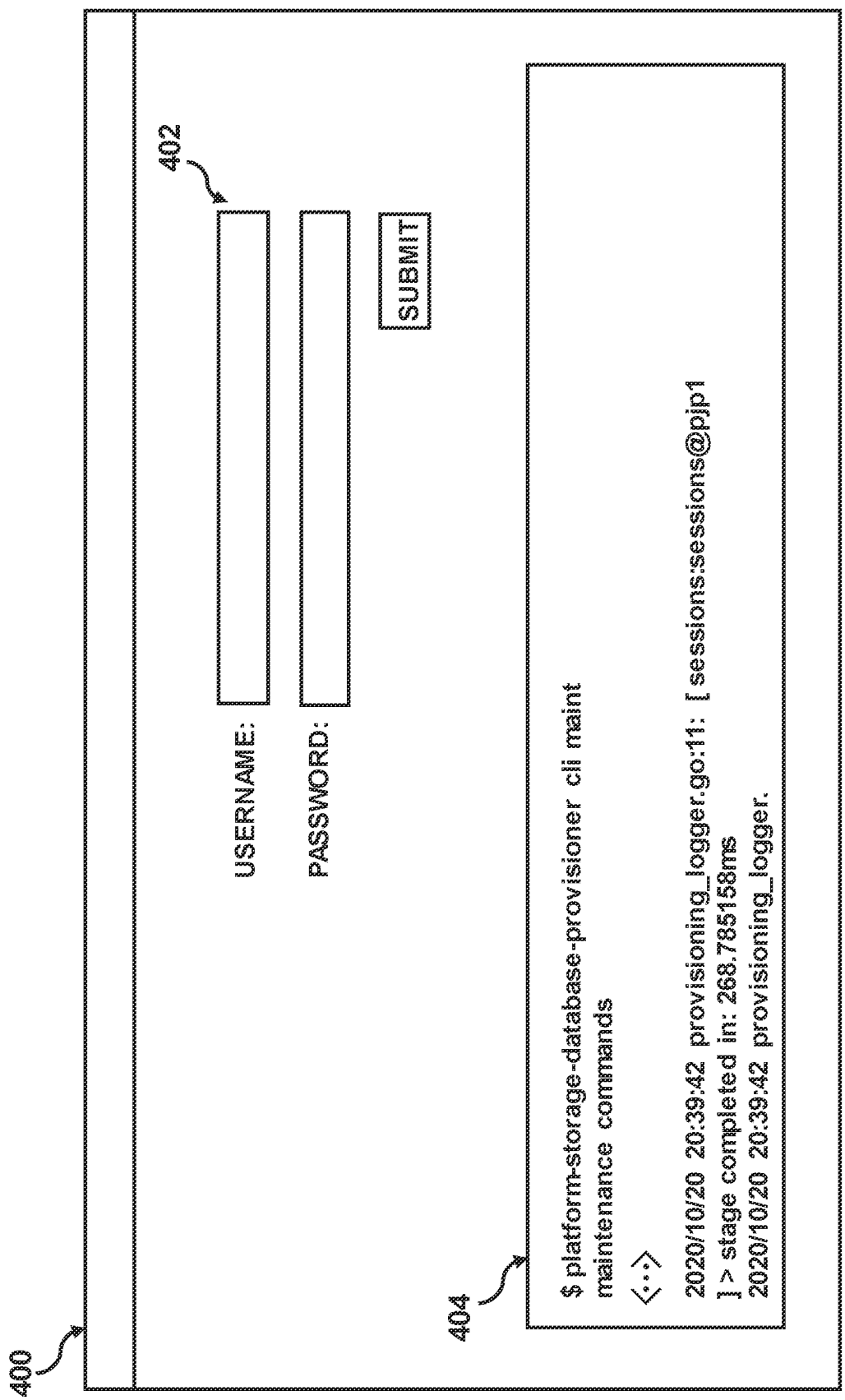
FIG. 4 shows an illustrative interface for provisioning and modifying a database system, in accordance with one or more embodiments.

FIG. 1 shows an illustrative system architecture for provisioning and modifying a database system, in accordance with one or more embodiments. For example, system 100 may represent the components used for provisioning and modifying a database system, as shown in FIGS. 2-4. As shown in FIG. 1, system 100 may include entity system 110, server system 112, and service provider system 114. Entity system 110, server system 112, and service provider system 114, may be a laptop computer, a tablet computer, a handheld computer, other computer equipment (e.g., a server), including "smart," wireless, wearable, and/or mobile devices. FIG. 1 also includes cloud components 108. Cloud components 108 may alternatively be any computing device as described above and may include any type of mobile terminal, fixed terminal, or other device. For example, cloud components 108 may be implemented as a cloud computing system and may feature one or more component devices. It should also be noted that system 100 is not limited to three devices. Users may, for instance, utilize one or more devices to interact with one another, one or more servers, or other components of system 100. It should be noted that, while one or more operations are described herein as being performed by particular components of system 100, those operations may, in some embodiments, be performed by other components of system 100. As an example, while one or more operations are described herein as being performed by components of Entity system 110, server system 112, and service provider system 114, those operations may, in some embodiments, be performed by components of cloud components 108. In some embodiments, the various computers and systems described herein may include one or more computing devices that are programmed to perform the described functions. Additionally, or alternatively, multiple users may interact with system 100 and/or one or more components of system 100. For example, in one embodiment, a first user and a second user may interact with system 100 using two different components.

In a non-limiting embodiment, the system may receive a request to provision a database system.

As referred to herein, a "database system" may be a locally managed or cloud-based collection of organized data stored across one or more storage devices (e.g., databases). The database system may be complex and developed using one or more design schema and modeling techniques. The database system may be hosted at one or more data centers operated by a cloud computing service provider. The database system may be refined over time using a machine learning model, for example the machine learning model discussed infra in FIG. 1. Additionally, the database system may be deployed and maintained automatically by one or more components shown in FIG. 1.

The system 100 may determine whether metadata associated with the database system exists. As referred to herein, "metadata" may be a set data that describes the attribute of a database or a database system. Metadata may include such database and database system attributes, such as size, number, service name, environment, table names, values, templates, table relationship information, constraints, parameters, data dictionary, cloud roadmap, data logs, geographic location, etc.

Upon determining that metadata associated with the database system does not exist, the system 100 may generate database system resources. As referred to herein, "database system resources" may include a data pipeline for enabling the flow of data from one device to another, schedules, virtual private cloud parameters, and database properties. The system 100 may then generate the database system based on the generated database resources. In response to generating the database system, the system 100 may generate user access credentials. As referred to herein, "user access credentials" are authentication mechanisms, for example username and passwords, certificates, and tokens, that regulate secure access to system 100, the server system 112, or the service provider system 114. User access credentials may include a set of or pre-determined rights, privileges, or administrative abilities. In response to the database system being generated, the system stores a second metadata associated with the database system in a metadata repository.

At a point in time subsequent to the system 100 receiving the request to provision a database, the system 100 may receive a request to modify the database system. The request to modify the database system may be decoupled from the request to provision the database. The system 100 may determine a set of pre-determined modification protocols. As referred to herein, "modification protocols" may be pre-established parameters, settings, guidelines, set by the entity requesting the modification or the service provider. For example, modification protocols may include allocated storage information, storage optimization information, database instance information, backup retention information, backup window information, certificate information, copy tag information, snapshot information, database port information, database monitoring information, database performance information, engine data, and publica accessibility information.

The system 100 may determine to create a standby database. As referred to herein, a "standby database" may be a database replica created from a backup of a primary database. A standby database may be created in response to a switchover, which is a role reversal between the primary database and one of its standby databases. A switchover guarantees no data loss and is typically done for planned maintenance of the primary system. During a switchover, the primary database transitions to a standby role, and the standby database transitions to the primary role. Alternatively, or additionally, a standby may be used in response to failover, wherein a failover is a role transition in which one of the standby databases is transitioned to the primary role after the primary database fails or has become unreachable. A failover may or may not result in data loss depending on the protection mode in effect at the time of the failover.

In response to determining whether to create a standby database, the system 100 may conduct an experiment on the database system. As referred to herein, an "experiment" may be a dry run or database system modification testing process wherein target database objects are isolated so the effects of implementing the various modifications are intentionally mitigated and do not impact live production. In response to the conducting the experiment, the system 100 may modify the database system.

This solution provides a novel approach to provisioning and modifying a cloud-based database system hosted by a service provider, because the requests (implemented via secure command line prompts or API calls) to provision and modify the database bypass conventional Infrastructure as Code systems that are used to manage database systems hosted by service providers in the cloud. Moreover, at least conducting experiments prior to modifying a database system, this solution reduces latency issues, downtime, and database failures. This solution also provides advantages over conventional solutions by permitting individual database configuration and modification as opposed to conventional methods which required mass configuration of resources within a cloud-based database system.

With respect to the components of cloud components 108, entity system 110, server system 112 and service provider system 114, each of these computing environments may receive content and data via input/output (hereinafter "I/O") paths. Each of these computing environments may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 1, entity system 110, server system 112 and service provider system 114 may include a display on which to display data. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 100 may run an application (or other suitable program). The application may cause the processors and/or control circuitry to perform operations related to generating alternative content.

Entity system 110 may be operated by a third-party in communication with server system 112. Alternatively, entity system 110 may be operated by a team within an entity that operates both the entity system 110 and server system 112.

Server system 112 may house cloud components 108 and although not shown in FIG. 1, may include one or more processors, servers, databases, and user terminals. Server system 112 may be operated by the same entity that operates entity system 110 or alternatively may be operated independently of entity system 110.

Service provider system 114 may be operated by a cloud computing company that provides remote on-demand computing resources. Service provider system 114 may include one or more processors, servers, databases, APIs, and user terminals. The computing resources, for example the databases, may be hosted via a virtual private cloud operated by the service provider system. As referred to herein, a "virtual private cloud" may be an on-demand configurable pool of shared resources allocated within a public cloud environment, however a certain level of isolation between the different organizations using the resources is maintained for security purposes. The databases hosted by service provider system 114 may be one or more of hierarchical databases, network databases, relational databases, object-oriented databases, graph databases, entity-relationship model databases, document databases, and/or NoSQL databases. In some instances, the computing resources, for example databases or data, may be decentralized and stored/hosted on a private or public ledger, such as a blockchain.

Entity system 110, server system 112 and service provider system 114 may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 1 also includes communication paths 118 and 120. Communication paths 118 and 120 may include the internet, a mobile phone network, a mobile voice, or data network (e.g., a 5G or LTE network), a cable network, a public switched telephone network, or other types of communications networks or combinations of communications networks. Communication paths 118 and 120 may additionally include infrared, WiFi, LiFi, Bluetooth, Near Field Communication (NFC), electric fields, magnetic fields, and RFID. Communication paths 118 and 120 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The communication paths 118 and 120 may include additional communication paths linking a plurality of hardware, software, and/or firmware components operating together. For example, the computing devices may be implemented by a cloud of computing platforms operating together as the computing devices.

Cloud components 108 may be a database configured to store entity data, training data, or database provisioning and modification trend data. For example, the database may include user data that the system 100 has collected about an entity or service provider (e.g., entity system 110 or service provider system 114) through prior interactions, both actively and passively. Alternatively, or additionally, the cloud components 108 may act as a clearing house for multiple sources of information about the entity or service provider (e.g., entity system 110 or service provider system 114). This information may be compiled into a cross-platform profile. For example, one or more of the cloud components 108 may include a microservice and/or components thereof. In some embodiments, the microservice may be a collection of applications that each collect one or more of the plurality of variables.

Cloud components 108 may include model 102, which may be a machine learning model. Model 102 may take inputs 104 and provide outputs 106. The inputs may include multiple datasets such as a training dataset and a test dataset. Each of the plurality of datasets (e.g., inputs 104) may include data subsets related to data associated with an entity or service provider (e.g., entity system 110 or service provider system 114), original content, and/or alternative content. In some embodiments, outputs 106 may be fed back to model 102 as inputs to train model 102. For example, the system may receive a first labeled feature input, wherein the first labeled feature input is labeled with a known error (or error likelihood) for the first labeled feature input (e.g., based on a collection of variables). The server system 112 may then train the model to classify the first labeled feature input with the known error (or error likelihood). The model 102 may receive database provisioning and modification requests (and corresponding metadata and databases resources) as input and refine the model 102 based on data related to successful and unsuccessful experiments and production modifications. Given that database management systems may offer solutions meant to simplify the database management process, the instant solution may provide predictions regarding optimal processes and resources for provisioning or maintaining a database system, and by recommending fuzzy logic commands that are presented via an interface. Moreover, the model 102 may refine training data based on provisioning and maintenance requests received from one or more entities associated with system 100.

In another embodiment, model 102 may update its configurations (e.g., weights, biases, or other parameters) based on the assessment of its prediction (e.g., outputs 106) and reference feedback information (e.g., user indication of accuracy, reference labels, or other information). For example, the model 102 may weight certain metadata or database resources more heavily than others based on training data or the type of database provisioning or modification request. The weights may additionally be associated with certain entity objectives, such as downtime, redundancy, or latency. In another embodiment, where model 102 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 102 may be trained to generate better predictions.

In some embodiments, model 102 may include an artificial neural network. In such embodiments, model 102 may include an input layer and one or more hidden layers. Each neural unit of model 102 may be connected with many other neural units of model 102. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 102 may be self-learning and trained, rather than explicitly programmed, and can perform significantly better in certain areas of problem solving, as compared to traditional computer programs. During training, an output layer of model 102 may correspond to a classification of model 102, and an input known to correspond to that classification may be input into an input layer of model 102 during training. During testing, an input without a known classification may be input into the input layer, and a determined classification may be output.

In some embodiments, model 102 may include multiple layers (e.g., where a signal path traverses from front layers to back layers). In some embodiments, back propagation techniques may be utilized by model 102 where forward stimulation is used to reset weights on the "front" neural units. In some embodiments, stimulation and inhibition for model 102 may be more free flowing, with connections interacting in a more chaotic and complex fashion. During testing, an output layer of model 102 may indicate whether or not a given input corresponds to a classification of model 102 (e.g., an incident).

For example, in some embodiments, the system may train a machine learning model (e.g., an artificial neural network) to detect a known error (or error likelihood) based on a collection of variables. The system may then generate a series of feature inputs based on the training data. For example, the system may generate a first feature input based on training data comprising user data corresponding to a first known error (or error likelihood). The system may label the first feature input with the first known error (e.g., labeling the data as corresponding to a classification of a given error type or likelihood).

For example, in some embodiments, the system may train a machine learning model (e.g., an artificial neural network) to determine a univariate response corresponding to the recommendation (e.g., a given error or error likelihood). For example, the system may receive an error recommendation (e.g., comprising a given error type and/or error likelihood). The system may then generate a series of features inputs based on the error recommendation. For example, the system may generate a first feature input based on training data comprising error recommendation and the system may determine a response (e.g., particular documentation or actions) corresponding to responding to a first known error recommendation. The system may label the first feature input with the first known error recommendation (e.g., labeling the data as corresponding to a classification of a given error type or likelihood).

The system may then train a machine learning model to detect the first known incident based on the labeled first feature input. The system may also train a machine learning model (e.g., the same or different machine learning model) to detect the second known incident based on the labeled second feature input. For example, the training process may involve initializing some random values for each of the training matrices (e.g., of a machine learning model) and attempting to predict the output of the input feature using the initial random values. Initially, the error of the model will be large, but comparing the model's prediction with the correct output (e.g., the known classification), the model is able to adjust the weights and biases values until having the model provides the required predictions.

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally, or alternatively, the system may receive user data files (e.g., as a download and/or streaming in real-time or near real-time).

System 100 also includes API layer 116. For example, in some embodiments, the system may be implemented as one or more APIs and/or an API layer. In some embodiments, API layer 116 may be implemented on entity system 110, server system 112, and/or service provider system 114. Alternatively, or additionally, API layer 116 may reside on one or more of cloud components 108. API layer 116 (which may be A REST or Web services API layer) may provide a decoupled interface to data and/or functionality of one or more applications. API layer 116 may provide a common, language-agnostic way of interacting with an application. Web service APIs offer a well-defined contract, called WSDL, that describes the services in terms of its operations and the data types used to exchange information. REST APIs do not typically have this contract, instead, they are documented with client libraries for most common languages including Ruby, Java, PHP, and JavaScript. SOAP Web services have traditionally been adopted in the enterprise for publishing internal services, as well as for exchanging information with partners in B2B transactions.

API layer 116 may use various architectural arrangements. For example, system 100 may be partially based on API layer 116, such that there is strong adoption of SOAP and RESTful Web-services, using resources like Service Repository and Developer Portal but with low governance, standardization, and separation of concerns. Alternatively, system 100 may be fully based on API layer 116, such that separation of concerns between layers like API layer 116, services, and applications are in place.

In some embodiments, the system architecture may use a microservice approach. Such systems may use two types of layers: Front-End Layer and Back-End Layer where microservices reside, in this kind of architecture, the role of the API layer 116 may provide integration between Front-End and Back-End. In such cases, API layer 116 may use RESTful APIs (exposition to front-end or even communication between microservices). API layer 116 may use AMQP (e.g., Kafka, RabbitMQ, etc.). API layer 116 may use incipient usage of new communications protocols such as gRPC, Thrift, etc.

In some embodiments, the system architecture may use an open API approach. In such cases, API layer 116 may use commercial or open-source API Platforms and their modules. API layer 116 may use developer portal. API layer 116 may use strong security constraints applying WAF and DDoS protection, and API layer 116 may use RESTful APIs as standard for external integration.

FIG. 2 shows an illustrative system architecture for provisioning a database system, in accordance with one or more embodiments. At step 202, process 200 (e.g., using one or more components in system 100 (FIG. 1)) may receive at a first point in time a first request to provision a database system. For example, a system (e.g., server system 112) may receive a request from entity system 110 to provision one or more databases hosted by service provider system 114. In response to receiving the first request to provision the database system, the system may generate a single command line prompt command or a single API call to a service provider (e.g., service provider system 114) to initiate the database provisioning process on one or more databases hosted by the service provider.

At step 204, the system may further query a metadata repository in order to determine whether the metadata exists at step 206. For example, in response to receiving the first request to provision one or more databases, the system may query a metadata repository to determine whether metadata associated with the first request to provision the one or more databases already exists. The metadata repository may be hosted by server system 112 or the service provider system 114. The system may further query the metadata repository to determine whether the metadata exists in response to receiving an indication that an authentication process associated with the single command line prompt command or single API call was accepted.

At step 208, the system may generate database system resources. For example, the system may generate database system resources based on determining whether metadata associated with the database system exists. For example, the system may create a data pipeline for enabling the flow of data from one device to another, schedules, virtual private cloud parameters, and database properties. In furtherance of generating database resources, the system may determine whether a legacy instance or virtual private cloud is generated. The system may additionally generate a virtual private cloud including subnets in response to determining whether a legacy or virtual private cloud is generated.

At step 210, the system may generate the database system. For example, the system may create a new instance of a database system comprising of one or more databases that may be hosted by service provider system 114. The database system may be automatically generated in response to the database system resources being generated.

At step 212, the system may generate user access credentials. For example, the system may generate user access credentials in response to generating the database system. In this instance, the system may create authentication mechanisms, for example username and password, certificates, and tokens, that regulate secure access to various components of system 100, and in particular the server system 112 or the service provider system 114. User access credentials may include a set of or pre-determined rights, privileges, or administrative abilities. In furtherance of step 212, the system may provide the user access credentials to the entity that sent the first request to provision the database system.

At step 214, the system may store a second metadata associated with the database system in the metadata repository. In this instance, the system may store the metadata that was created as a byproduct of generating the database system and database system resources in the metadata repository. This second metadata may include database system attributes, such as size, number, service name, environment, table names, values, templates, table relationship information, constraints, parameters, data dictionary, cloud roadmap, data logs, geographic location, etc.

At step 216, the system may end the process 200. It is contemplated that the features or descriptions of FIG. 2 may be done in alternative orders, or in parallel, to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 1 could be used to perform one or more of the steps in FIG. 2.

FIG. 3 shows an illustrative flowchart for modifying a database system, in accordance with one or more embodiments. At step 302, process 300 (e.g., using one or more components in system 100 (FIG. 1)) may receive a second request to modify the database system. For example, at a second point in time, subsequent to the first point in time, the system may receive a second request to modify the database system. In this instance, the second request may include one or more modification parameters and the user's access credentials.

At step 304, the system may determine a set of pre-determined modification protocols. For example, in response to the second request to modify the database system, the system may determine a set of pre-determined modification protocols. In this instance the system may automatically identify parameters, settings, guidelines, set by the entity requesting the modification or the service provider that result in a successful modification of the database system.

At step 306, the system may determine whether to create a standby database system. For example, in response to the second request to modify the database system and the set of pre-determined modification protocols, the system may determine whether to create a standby database system. In this instance, the system may initiate a failover protocol and generate the standby database system based on the failover protocol and the determination as to whether to create the standby database system. The system may determine a first geographical region for the database system and generate the standby database system in a second geographical region different than the first geographical region. For example, the system may identify a physical geographic region (e.g., Palo Alto, Calif.) the database system is hosted at and generate the standby database system in another geographic region (e.g., Dulles, Va.). The system may further modify a first server to point live traffic to the standby database system. Here, for example, the system may modify a domain name system (DNS) to redirect traffic from the database system to the standby database system. The system may determine a recovery point threshold and a recovery time threshold associated with an entity. For example, the system may determine a maximum amount of data, as measured by time, that can be lost after a recovery from a disaster, failure, or comparable event before data loss will exceed what is acceptable to the entity. Furthermore, the system may determine a duration of time and a service level within which the database system must be restored after a disaster in order to avoid unacceptable consequences associated with a break in continuity. The system may additionally, convert and label the standby database system to a primary database system, in response to modifying the first server to point live traffic to the standby database system.

At step 308, the system may transmit a third request for conducting an experiment on the database system. For example, the system may perform a dry run or database system modification testing process wherein the requested modifications are made to database resources and target database objects are isolated so the effects of implementing the various modifications are intentionally mitigated and do not impact live production. In furtherance this step, the system may determine whether the database system failed in response to conducting the experiment. Upon determining that the experiment was successful, the system may convert and label the database system as the primary database system and modify the first server to point live traffic to the database system. Alternatively, upon determining that the experiment was unsuccessful, identifying errors associated with the experiment, continuing to point live traffic to the standby database system, and conducting a second experiment, wherein the second experiment includes at least solutions to the identified errors.

At step 310, the system may modify the database system based on the experiment. For example, upon a determination that the experiment was successful, the system may implement the modifications requested by the entity. It is contemplated that the features or descriptions of FIG. 3 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 1 could be used to perform one or more of the steps in FIG. 3.

FIG. 4 shows an illustrative interface for provisioning and modifying a database system, in accordance with one or more embodiments. Interface 400 may be a (an application or web browser-based) portal configured to provide an entity (e.g., server system 112) with direct access to service provider system 114, for example a database system associated with server system 112 created in a virtual private cloud. Interface 400 may include credential area 402 and command area 404. Credential area 402 may include fields for receiving user input, for example, one or more fields for receiving a username or password, a field for selecting a certificate or access token, and/or fields for providing user options related to authentication. Credential area 402 may further include fields for setting administrative rights and privileges for users, teams, and computing components on system 100. Command area 404 may include input and output fields for managing one or more components in system 100 on a granular level. For example, command area 404 may enable server system 112 to remotely manage systems (e.g., a database system) hosted by service provider system 114. Command area 404 may include fields for receiving commands and scripts for creating and modifying systems (e.g., a database system) in system 100. For example, at step 202 and 302, wherein requests for provisioning and modifying a database system are received respectively, a single command line prompt or API call may have been initiated via a portal, for example interface 400 and command area 404. Command area 404 may be configured to provide auto-completion for various commands, options, and resource identifies. For example, command area 404 may identify the initial components of a command being entered, predict the full command that is likely desired, and display the predicted full command in interface 400, for example in command area 404. Auto-completion may be implemented via a combination of fuzzy logic and predications made by the model 102. Command area 404 may also be configured to provide dynamic in-line instructions and options and pre-written shell commands. Interface 400 may be in communication with cloud components 108 and recommend and display certain commands based on system (e.g., database) provisioning, maintenance, and modifying trends identified by model 102.

It is contemplated that the features or descriptions of FIG. 4 may be used with any other embodiment of this disclosure. In addition, the features and descriptions described in relation to FIG. 4 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIGS. 1-3 could be used to perform one or more of the steps in FIG. 4.

Figure 5:
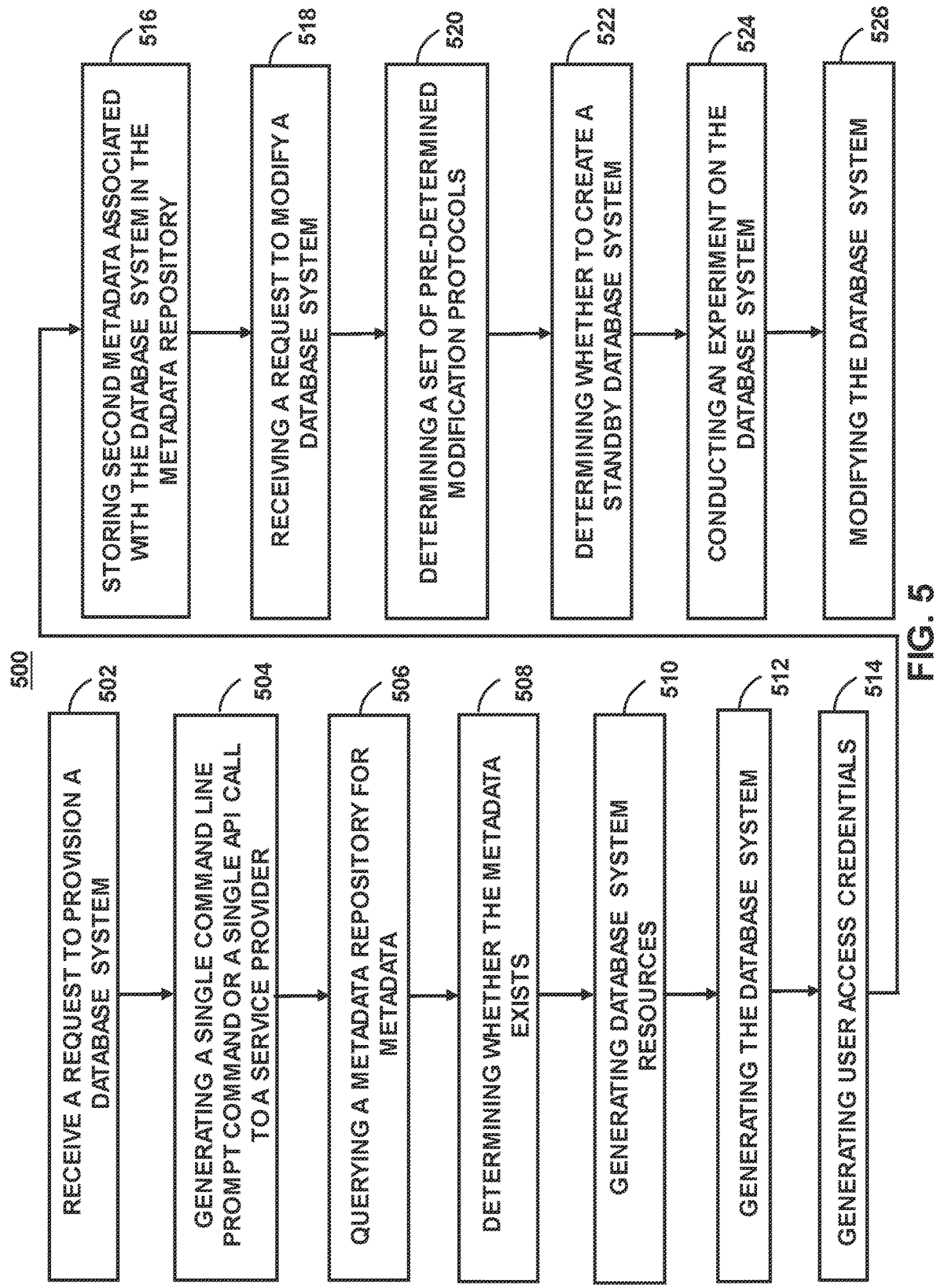
FIG. 5 shows an illustrative flowchart for provisioning and modifying a database system, in accordance with one or more embodiments.

FIG. 5 shows an illustrative system architecture for provisioning and modifying a database system, in accordance with one or more embodiments. At step 502, process 500 (e.g., using one or more components in system 100 (FIG. 1)) may receive at a first point in time a first request to provision a database system. For example, a system (e.g., server system 112) may receive a first request from entity system 110 to provision one or more databases hosted by service provider system 114.

At step 504, the system may generate a single command line prompt command and/or a single API call to a service provider. For example, in response to receiving the first request to provision the database system, the system may generate a single command line prompt command and/or a single API call to a service provider (e.g., service provider system 114) to initiate the database system provisioning process on one or more databases hosted by the service provider.

At step 506, the system may further query a metadata repository for metadata.

At step 508 the system may determine whether the metadata exists in the metadata repository. For example, in response to receiving the first request to provision one or more databases, the system may query a metadata repository to determine whether metadata associated with the first request provision one or more database already exists. The metadata repository may be hosted by server system 112 or the service provider system 114. The system may further query the database to determine whether the metadata exists in response to receiving an indication that an authentication process associated with the single command line prompt command or single API call was accepted.

At step 510, the system may generate database system resources. For example, the system may generate database system resources based on determining whether metadata associated with the database system exists. For example, the system may create a data pipeline for enabling the flow of data from one device to another, schedules, virtual private cloud parameters, and database properties. In furtherance of generating database resources, the system may determine whether a legacy instance or virtual private cloud is generated. The system may additionally generate a virtual private cloud including subnets in response to determining whether a legacy or virtual private cloud is generated.

At step 512, the system may generate the database system. For example, the system may create a new instance of a database system comprising of one or more databases that may be hosted by service provider system 114. The database system may be automatically generated in response to the database system resources being generated.

At step 514, the system may generate user access credentials. For example, the system may generate user access credentials in response to generating the database system. In this instance, the system may create authentication mechanisms, for example username and password, certificates, and tokens, that regulate secure access to various components of system 100, and in particular the server system 112 or the service provider system 114. User access credentials may include a set of or pre-determined rights, privileges, or administrative abilities. In furtherance of step 212, the system may provide the user access credentials to the entity that sent the first request to provision the database system.

At step 516, the system may store a second metadata associated with the database system in the metadata repository. In this instance, the system may store the metadata that was created as a byproduct of generating the database system and database system resources in the metadata repository. The second metadata may include database system attributes, such as size, number, service name, environment, table names, values, templates, table relationship information, constraints, parameters, data dictionary, cloud roadmap, data logs, geographic location, etc.

At step 518, process 500 (e.g., using one or more components in system 100 (FIG. 1)) may receive a second request to modify the database system. For example, at a second point in time, subsequent to the first point in time, the system may receive a second request to modify the database system. In this instance, the second request may include one or more modification parameters and the user's access credentials. The system may generate a single command line prompt command and/or a single API call to a service provider (e.g., service provider system 114) to initiate the database system modification process on one or more databases hosted by the service provider.

At step 520, the system may determine a set of pre-determined modification protocols. For example, in response to the request to modify the database system, the system may determine a set of pre-determined modification protocols. In this instance the system may automatically identify parameters, settings, guidelines, set by the entity requesting the modification or the service provider that result in a successful modification of the database system.

At step 522, the system may determine whether to create a standby database system. For example, in response to the second request to modify the database system and the set of pre-determined modification protocols, the system may determine whether to create a standby database system. In this instance, the system may initiate a failover protocol and generate the standby database system based on the failover protocol and the determination as to whether to create the standby database system. The system may determine a first geographical region for the database system and generate the standby database system in a second geographical region different than the first geographical region. For example, the system may identify a physical geographic region (e.g., Palo Alto, Calif.) the database system is hosted at and generate the standby database system in another geographic region (e.g., Dulles, Va.). The system may further modify a first server to point live traffic to the standby database system. Here, for example, the system may modify a domain name system (DNS) to redirect traffic from the database system to the standby database system. The system may determine a recovery point threshold and a recovery time threshold associated with an entity. For example, the system may determine a maximum amount of data, as measured by time, that can be lost after a recovery from a disaster, failure, or comparable event before data loss will exceed what is acceptable to the entity. Furthermore, the system may determine a duration of time and a service level within which the database system must be restored after a disaster in order to avoid unacceptable consequences associated with a break in continuity. The system may additionally, convert and label the standby database system to a primary database system, in response to modifying the first server to point live traffic to the standby database system.

At step 524, the system may transmit a third request for conducting an experiment on the database system. For example, the system may perform a dry run or database system modification testing process wherein the requested modifications are made to database resources and target database objects are isolated so the effects of implementing the various modifications are intentionally mitigated and do not impact live production. In furtherance this step, the system may determine whether the database system failed in response to conducting the experiment. Upon determining that the experiment was successful, the system may convert and label the database system as the primary database system and modify the first server to point live traffic to the database system. Alternatively, upon determining that the experiment was unsuccessful, identifying errors associated with the experiment, continuing to point live traffic to the standby database system, and conducting a second experiment, wherein the second experiment includes at least solutions to the identified errors.

At step 526, the system may modify the database system based on the experiment. For example, upon a determination that the experiment was successful, the system may implement the modifications requested by the entity. It is contemplated that the features or descriptions of FIG. 5 may be done in alternative orders, or in parallel to further the purposes of this disclosure. For example, each of these steps may be performed in any order, or in parallel, or substantially simultaneously to reduce lag or increase the speed of the system or method. Furthermore, it should be noted that any of the devices or equipment discussed in relation to FIG. 1 could be used to perform one or more of the steps in FIG. 5.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:
1. A method, the method comprising: receiving, at a first point in time, a first request to provision a database system; in response to receiving the first request, generating a single command line prompt command or a single API call to a service provider, wherein the service provider hosts the database system; in response to the first request, determining, by querying a metadata repository, whether a first metadata associated with the database system exists; based on determining whether the first metadata associated with the database system exists, generating database system resources; in response to generating the database system resources, generating the database system; in response to generating the database system, generating user access credentials; storing, in the metadata repository, a second metadata associated with the database system; receiving a second request to modify the database system, wherein the second request includes one or more modification parameters and the user access credentials, and wherein the second request is further received at a second point in time subsequent to the first point in time; in response to the second request, determining a set of pre-determined modification protocols; in response to the second request and based on the set of pre-determined modification protocols, determining whether to create a standby database systems; transmitting a third request, wherein the third request includes instructions for conducting an experiment on the database system based at least on the set of pre-determined modification protocols and by executing the one or more modification parameters; and modifying the database system based on the experiment.
2. The method of any one of the preceding embodiments, further comprising: determining whether metadata associated with the database system exists, in response to receiving an indication that authentication associated with the single command line prompt command or single API call was accepted.
3. The method of any one of the preceding embodiments, further comprising: determining whether a legacy instance or virtual private cloud is generated, based on determining whether metadata associated with the database system exists; and generating a virtual private cloud including subnets in response to determining whether a legacy or virtual private cloud is generated.
4. The method of any one of the preceding embodiments, further comprising: creating one or more of: a username and password; multifactor authentication protocols; one or more certificates; a token; and providing the user access credentials to an entity that sent the first request to provision the database system.
5. The method of any one of the preceding embodiments, further comprising: initiating a failover protocol; generating the standby database system based on the failover protocol and the determination as to whether to create the standby database system; and modifying a first server to point live traffic to the standby database system.
6. The method of any one of the preceding embodiments, further comprising: converting and labeling the standby database system to a primary database system, in response to modifying the first server to point live traffic to the standby database system; determining whether the database system failed in response to conducting the experiment; and in response to: determining that that the experiment was successful, converting and labeling the database system as a primary database system and modifying the first server to point live traffic to the database system; or determining that the experiment was unsuccessful, identifying errors associated with the experiment, continuing to point live traffic to the standby database system, and conducting a second experiment, wherein the second experiment includes at least solutions to the identified errors.
7. The method of any one of the preceding embodiments, further comprising: determining a first geographical region for the database system and generating the standby database system in a second geographical region different than the first geographical region; and determining a recovery point threshold and a recovery time threshold associated with an entity.
8. A system comprising: one or more processors; and memory storing instructions that, when executed by the processors, cause the processors to effectuate operations comprising those of any of embodiments 1-7.
9. A tangible, non-transitory, machine-readable medium storing instructions that, when executed, by a data processing apparatus, cause: the data processing apparatus to perform operations comprising those of any of embodiments 1-7.

What is claimed is:

1. A server system for provisioning and modifying database systems such that a database management system may be bypassed using a single line command prompt and an API call comprising:
one or more storage devices storing instructions; and
one or more processors configured to execute the instructions for:
receiving, at a first point in time, a first request to provision a database system;
in response to receiving the first request, generating a single command line prompt command or a single API call to a service provider, wherein the service provider hosts the database system;
in response to the first request, determining, by querying a metadata repository, whether a first metadata associated with the database system exists;
based on determining whether the first metadata associated with the database system exists, generating database system resources;
in response to generating the database system resources, generating the database system;
in response to generating the database system, generating user access credentials;
storing, in the metadata repository, a second metadata associated with the database system;
receiving a second request to modify the database system, wherein the second request includes one or more modification parameters and the user access credentials, and wherein the second request is further received at a second point in time subsequent to the first point in time;
in response to the second request, determining a set of pre-determined modification protocols;
in response to the second request and based on the set of pre-determined modification protocols, determining whether to create a standby database system;
transmitting a third request, wherein the third request includes instructions for conducting an experiment on the database system based at least on the set of pre-determined modification protocols and by executing the one or more modification parameters;
modifying the database system based on the experiment;
initiating a failover protocol;
generating the standby database system based on the failover protocol and the determination as to whether to create the standby database system;
modifying a first server to point live traffic to the standby database system;
converting and labeling the standby database system to a primary database system, in response to modifying the first server to point live traffic to the standby database system;
determining whether the database system failed in response to conducting the experiment; and
either:
in response to determining that that the experiment was successful, converting and labeling the database system as a primary database system and modifying the first server to point live traffic to the database system; or
in response to determining that the experiment was unsuccessful, identifying errors associated with the experiment, continuing to point live traffic to the standby database system, and conducting a second experiment, wherein the second experiment includes at least solutions to the identified errors.

2. The server system of claim 1, further comprising:
determining whether metadata associated with the database system exists, in response to receiving an indication that authentication associated with the single command line prompt command or single API call was accepted.

3. The server system of claim 1, wherein generating database system resources further comprises:
determining whether a legacy instance or virtual private cloud is generated, based on determining whether metadata associated with the database system exists; and
generating a virtual private cloud including subnets in response to determining whether a legacy or virtual private cloud is generated.

4. The server system of claim 1, wherein generating user access credentials further comprises:
creating one or more of:
a username and password;
multifactor authentication protocols;
one or more certificates; and
a token; and
providing the user access credentials to an entity that sent the first request to provision the database system.

5. The server system of claim 1, wherein initiating the failover protocol further comprises:
determining a first geographical region for the database system and generating the standby database system in a second geographical region different than the first geographical region; and
determining a recovery point threshold and a recovery time threshold associated with an entity.

6. A computer-implemented method for provisioning and modifying database systems such that a database management system may be bypassed using a single line command prompt and an API call comprising:
receiving, at a first point in time, a first request to provision a database system;
in response to receiving the first request, generating a single command line prompt command or a single API call to a service provider, wherein the service provider hosts the database system;
in response to the first request, determining, by querying a metadata repository, whether a first metadata associated with the database system exists;
based on determining whether the first metadata associated with the database system exists, generating database system resources;
in response to generating the database system resources, generating the database system;
in response to generating the database system, generating user access credentials;
storing, in the metadata repository, a second metadata associated with the database system;
receiving a second request to modify the database system, wherein the second request includes one or more modification parameters and the user access credentials, and wherein the second request is further received at a second point in time subsequent to the first point in time;

in response to the second request, determining a set of pre-determined modification protocols;
in response to the second request and based on the set of pre-determined modification protocols, determining whether to create a standby database system;
transmitting a third request, wherein the third request includes instructions for conducting an experiment on the database system based at least on the set of pre-determined modification protocols and by executing the one or more modification parameters;
modifying the database system based on the experiment;
initiating a failover protocol;
generating the standby database system based on the failover protocol and the determination as to whether to create the standby database system;
modifying a first server to point live traffic to the standby database system;
converting and labeling the standby database system to a primary database system, in response to modifying the first server to point live traffic to the standby database system;
determining whether the database system failed in response to conducting the experiment; and
either:
in response to determining that that the experiment was successful, converting and labeling the database system as a primary database system and modifying the first server to point live traffic to the database system; or
in response to determining that the experiment was unsuccessful, identifying errors associated with the experiment, continuing to point live traffic to the standby database system, and conducting a second experiment, wherein the second experiment includes at least solutions to the identified errors.

7. The computer-implemented method of claim 6, further comprising:
determining whether metadata associated with the database system exists, in response to receiving an indication that authentication associated with the single command line prompt command or single API call was accepted.

8. The computer-implemented method of claim 6, wherein generating database system resources further comprises:
determining whether a legacy instance or virtual private cloud is generated, based on determining whether metadata associated with the database system exists; and
generating a virtual private cloud including subnets in response to determining whether a legacy or virtual private cloud is generated.

9. The computer-implemented method of claim 6, wherein generating user access credentials further comprises:
creating one or more of:
a username and password;
multifactor authentication protocols;
one or more certificates; and
a token; and
providing the user access credentials to an entity that sent the first request to provision the database system.

10. The computer-implemented method of claim 6, wherein initiating the failover protocol further comprises:
determining a first geographical region for the database system and generating the standby database system in a second geographical region different than the first geographical region; and
determining a recovery point threshold and a recovery time threshold associated with an entity.

11. A non-transitory computer-readable medium, storing instructions for provisioning and modifying database systems such that a database management system may be bypassed using a single line command prompt and an API call that when executed by one or more processors perform a method comprising:
receiving, at a first point in time, a first request to provision a database system;
in response to receiving the first request, generating a single command line prompt command or a single API call to a service provider, wherein the service provider hosts the database system;
in response to the first request, determining, by querying a metadata repository, whether a first metadata associated with the database system exists;
based on determining whether the first metadata associated with the database system exists, generating database system resources;
in response to generating the database system resources, generating the database system;
in response to generating the database system, generating user access credentials;
storing, in the metadata repository, a second metadata associated with the database system;
receiving a second request to modify the database system, wherein the second request includes one or more modification parameters and the user access credentials, and wherein the second request is further received at a second point in time subsequent to the first point in time;
in response to the second request, determining a set of pre-determined modification protocols;
in response to the second request and based on the set of pre-determined modification protocols, determining whether to create a standby database system;
transmitting a third request, wherein the third request includes instructions for conducting an experiment on the database system based at least on the set of pre-determined modification protocols and by executing the one or more modification parameters; and
modifying the database system based on the experiment;
initiating a failover protocol, wherein initiating a failover protocol further includes;
determining a first geographical region for the database system and generating the standby database system in a second geographical region different than the first geographical region;
determining a recovery point threshold and a recovery time threshold associated with an entity;
generating the standby database system based on the failover protocol and the determination as to whether to create the standby database system; and
modifying a first server to point live traffic to the standby database system;
converting and labeling the standby database system to a primary database system, in response to modifying the first server to point live traffic to the standby database system;
determining whether the database system failed in response to conducting the experiment; and
either:
in response to determining that that the experiment was successful, converting and labeling the database system as a primary database system and modifying the first server to point live traffic to the database system; or in response to determining that the experiment was unsuccessful, identifying errors associated with the experiment, continuing to point live traffic to the standby database system, and conducting a second experiment, wherein the second experiment includes at least solutions to the identified errors.

12. The non-transitory computer-readable medium of claim 11, further comprising:

determining whether metadata associated with the database system exists, in response to receiving an indication that authentication associated with the single command line prompt command or single API call was accepted.

13. The non-transitory computer-readable medium of claim 11, wherein generating database system resources further comprises:

determining whether a legacy instance or virtual private cloud is generated, based on determining whether metadata associated with the database system exists; and generating a virtual private cloud including subnets in response to determining whether a legacy or virtual private cloud is generated.

14. The non-transitory computer-readable medium of claim 11, wherein generating user access credentials further comprises:

creating one or more of:
- a username and password;
- multifactor authentication protocols;
- one or more certificates; and
- a token; and providing the user access credentials to an entity that sent the first request to provision the database system.

\* \* \* \* \*